United States Patent
Yang et al.

(10) Patent No.: US 11,222,465 B2
(45) Date of Patent: Jan. 11, 2022

(54) EMBEDDED URBAN DESIGN SCENE EMULATION METHOD AND SYSTEM

(71) Applicant: SOUTHEAST UNIVERSITY, Jiangsu (CN)

(72) Inventors: Junyan Yang, Jiangsu (CN); Jun Cao, Jiangsu (CN); Qingyao Zhang, Jiangsu (CN); Beixiang Shi, Jiangsu (CN); Yi Shi, Jiangsu (CN)

(73) Assignee: Southeast University, Nanjing (CN)

( * ) Notice: Subject to any disclaimer, the term of this patent is extended or adjusted under 35 U.S.C. 154(b) by 0 days.

(21) Appl. No.: 17/043,580

(22) PCT Filed: Feb. 27, 2020

(86) PCT No.: PCT/CN2020/077048
§ 371 (c)(1),
(2) Date: Sep. 29, 2020

(87) PCT Pub. No.: WO2020/192354
PCT Pub. Date: Oct. 1, 2020

(65) Prior Publication Data
US 2021/0248816 A1    Aug. 12, 2021

(51) Int. Cl.
*G06T 17/05* (2011.01)
*G06T 7/40* (2017.01)
(Continued)

(52) U.S. Cl.
CPC ............ *G06T 17/05* (2013.01); *G06T 7/40* (2013.01); *G06T 7/60* (2013.01); *G06T 17/00* (2013.01);
(Continued)

(58) Field of Classification Search
CPC .. G06T 17/05; G06T 19/20; G06T 2219/2004
See application file for complete search history.

(56) References Cited

U.S. PATENT DOCUMENTS

| 8,463,024 B1* | 6/2013 | Gallup | G06T 7/596 |
| | | | 382/154 |
| 2010/0034483 A1* | 2/2010 | Giuffrida | G06T 11/60 |
| | | | 382/284 |

(Continued)

FOREIGN PATENT DOCUMENTS

| CN | 108537890 A | 9/2018 |
| CN | 109035400 A | 12/2018 |

(Continued)

OTHER PUBLICATIONS

Dold, Christoph & Brenner, Claus. (2004). Automatic matching of terrestrial scan data as a basis for the generation of detailed 3D city models. International Archives of Photogrammetry, Remote Sensing and Spatial Information Sciences. 35. (Year: 2004).*

*Primary Examiner* — Phi Hoang
(74) *Attorney, Agent, or Firm* — Muncy, Geissler, Olds & Lowe, P.C.

(57) ABSTRACT

The present invention discloses an embedded urban design scene emulation method and system. The method includes the following steps: constructing a status quo urban three-dimensional model scene according to collected oblique photography data; loading a three-dimensional model of urban design to a scene, and extracting geometric attributes for generation of buildings; unifying a space coordinate system of models and scenes, and automatically determining a space matching degree by taking buildings as a basic unit, and marking matched buildings with Y and mismatched buildings with N for distinction; for a region with the buildings marked with N, performing a local flattening operation in a three-dimensional model scene of oblique photography to flatten stereo data; for a region with the buildings marked with Y, performing real-time space editing in the three-dimensional model of urban design to hide the marked buildings; and opening two sets of processed space (Continued)

data to implement mosaic display. The present invention can conveniently embed a three-dimensional model of urban design into a status quo three-dimensional model of oblique photography for scene emulation, and provides technical and method supports for digital presentation and management of urban design achievements.

13 Claims, 5 Drawing Sheets

(51) Int. Cl.
  *G06T 7/60* (2017.01)
  *G06T 19/20* (2011.01)
  *G06T 17/00* (2006.01)
(52) U.S. Cl.
  CPC .......... *G06T 19/20* (2013.01); *G06T 2200/08* (2013.01); *G06T 2219/2004* (2013.01)

(56) References Cited

U.S. PATENT DOCUMENTS

| | | | |
|---|---|---|---|
| 2011/0148866 A1* | 6/2011 | Chu | G06T 17/05 345/419 |
| 2012/0314935 A1* | 12/2012 | Cheng | G06K 9/00671 382/154 |
| 2017/0084077 A1* | 3/2017 | Liu | G06T 17/05 |
| 2017/0277951 A1* | 9/2017 | Wagner | G06K 9/6202 |
| 2019/0094021 A1* | 3/2019 | Singer | G06T 19/006 |
| 2019/0197769 A1* | 6/2019 | Khosrowpour | G06K 9/6202 |

FOREIGN PATENT DOCUMENTS

| | | |
|---|---|---|
| CN | 109410327 A | 3/2019 |
| CN | 109934914 A | 6/2019 |

\* cited by examiner

EMBEDDED URBAN DESIGN SCENE EMULATION METHOD AND SYSTEM

BACKGROUND

Technical Field

The present invention belongs to the field of urban planning, and in particular relates to an embedded urban design scene emulation method and system.

Related Art

Urban design mainly studies construction mechanisms and place creation of urban spatial forms, and is design research, engineering practice, and implementation management activities carried out for urban living environments including factors such as human, nature, society, culture, and spatial forms (Encyclopedia of China, 3rd edition). The urban design is a discipline that focuses on the shaping of urban forms. Compared with the consideration of urban planning for urban layout at a two-dimensional level, the urban design focuses more on a three-dimensional substance space form of urban space.

As a geocomplex of population, resources, environments, and social and economic factors, cities show the characteristics of dynamic changes and become increasingly complex in substance space due to an influence mechanism of multiple factors in the process of continuous expansion. Moreover, the urban design, as a reasonable design of urban substance space form, pays attention to joint decisions of government, citizen, designers, and other parties in terms of compilation, and compilation achievements need to be visually and clearly presented from multiple perspectives. However, compared with the complexity of substance space, displaying urban design achievements in a conventional manner such as rendering, models, or animation, has the defects of stillness and machinery. With respect to the problems, an urban design emulation technology can make complex urban space and design achievements easy to understand due to its intuitiveness in presentation effect and convenience in practical operation. The application of the emulation technology in the urban design just conforms to the characteristics of the complexity of the substance space and inherent requirements presented by the urban design achievements.

The so-called emulation technology refers to a technology of establishing an emulation model and conducting an emulation experiment, which comprehensively integrates a plurality of high and new technologies such as computers, networks, graphic images, multimedia, information, and automatic control. At present, a scene emulation technology in the field of urban design pays more attention to three-dimensional visualization of urban design schemes, which is implemented mainly by acquiring data to establish models and then by means of roaming system integration. At present, main technical means are mainly divided into two categories.

One is to obtain status quo urban and building models through a technology such as oblique photography or laser scanning to perform scene emulation, that is, to acquire more complete and accurate positive and oblique information of ground objects by carrying a plurality of sensors on the same unmanned flight platform and simultaneously collecting ground images from different angles, such as vertical and oblique angles (Application of Unmanned Aerial Vehicle Oblique Photogrammetry Technology in Three-dimensional Urban Modeling and Three-dimensional Data Updating) and (Three-dimensional Building Modeling based on Three-dimensional Laser Scanning Data).

The other is to establish a high-precision three-dimensional model through software such as Sketchup, Arcgis, and 3Dmax for scene emulation of the design achievements (Construction of Campus Three-dimensional Landscape based on 2DGIS) and (Research on Urban Three-dimensional Modeling and Precision based on 3DMAX).

The application of an oblique photography technology to scene emulation has the advantages of high authenticity and efficiency. Oblique photography can reflect real situations of the ground objects, and at the same time, greatly makes up for the shortage of orthophoto application and three-dimensional laser modeling. Meanwhile, it has the advantages of building texture collection and small amount of data. Its disadvantages lie in poor timeliness and status quo orientation. Due to the characteristics of modeling based on status quo urban mapping, the oblique photography technology is more suitable for the visual expression of status quo urban environments, and updates status quo models through multiple mapping, so scene emulation of the urban design schemes cannot be performed.

The application of a high-precision three-dimensional model technology has the advantages of timeliness and design orientation. A three-dimensional model may be updated in real time by placing the urban design schemes on the basis of the status quo model, and with changes of the urban design schemes and placement of multi-plot urban design schemes, which is beneficial to the optimization of the design schemes and the operation of urban management. Its disadvantage lies in relatively poor authenticity. Modeling by means of a modeling tool focuses on expressing surrounding environments of the design schemes and internal space of the schemes, but ignores detailed descriptions about status quo urban space environments, which is significantly different from the actual scene effect.

At present, a relatively obvious defect in the application of two main scene emulation technologies is that it is difficult to give consideration to both "status quo" and "design". It is obviously not in line with work objectives and appeal of the urban design to either focus on the status quo and ignore the design, or focus on the design and ignore the status quo. From the perspective of the relationship between design achievements and status quo situations, "subversive" urban design also exists, that is, the design achievements have nothing to do with the status quo situations. However, more "updated" urban design exists, which retains a lot of status quo in the design achievements and only changes part of the building construction. Especially under the background of rapid urbanization entering the middle and late stage in China, urban design pays more attention to the micro update in stock space. Such background more prompts upgrading of an urban design emulation method, that is, both "status quo" and "design" should be taken into account in urban design emulation, an urban design scheme is placed into the stock space by using a computer technology, and status quo buildings and environments retained after design are displayed still with oblique photography, and status quo buildings and environments not existing after design are "deleted" and replaced with newly-added buildings and environments under design, to perform three-dimensional scene emulation.

However, several difficulties also exist in the fusion of the two main technologies. Firstly, in terms of coordinates adopted, the former mostly adopts the 2000 Chinese Geodetic Coordinate System (CGCS2000), while the latter mostly adopts the WGS-84 coordinate system. If the method of direct embedding is adopted, there is a hidden problem of how to unify the two coordinate systems. At the same time, if a three-dimensional model of urban design is embedded into status quo urban space by means of manual embedding, it is prone to defects of low intelligence. Due to differences between the two technical means, manual embedding is easy to bring the disadvantages of arbitrariness of technical results and low work efficiency; especially in the case of a relatively large quantity of buildings, it is impossible to manually embed huge building data into a status quo urban model for scene emulation in a short time.

SUMMARY

Invention objective: with respect to the foregoing problems existing in the present invention, the present invention provides an embedded urban design scene emulation method and system, which can perform automatic determination of space matching and marking on status quo buildings and environments represented by a "three-dimensional model of oblique photography" and newly added and designed buildings and environments represented by a "three-dimensional model of urban design" and then implement urban design scene emulation by editing, to avoid the problems that the conventional operation cannot take both the status quo and design into account, or the arbitrariness of technical results and the low work efficiency in the manual embedding manner.

Technical solution: to achieve the objective of the present invention, a technical solution adopted in the present invention is: an embedded urban design scene emulation method, including the following steps.

In step 1, for oblique photography data in an established range obtained by collection, scene construction is performed through a series of technologies such as platform loading, geometric correction, and data thinning to form a three-dimensional model of oblique photography, and object management and feature extraction on a building model are implemented. The feature extraction means extracting geometric attributes for generation of each building.

In step 2, coordinate system transformation is performed on a three-dimensional model of urban design in an established range, three-dimensional model data of urban design is loaded into a three-dimensional model scene of oblique photography, and geometric attributes for generation of each building are extracted. The three-dimensional model of urban design is one of the achievement forms of the urban design business. For a region corresponding to a design range, elements such as road, blocks, and buildings therein are modeled. The three-dimensional model of urban design referred to in this application refers in particular to buildings. The geometric attributes are bottom surface length, width, and building height information of objects.

In step 3, for the three-dimensional model scene of oblique photography and three-dimensional model data of urban design in a unified space coordinate system, automatic determination of space matching is performed by taking buildings as a basic unit, matched buildings are marked with Y, and mismatched buildings are marked with N.

In step 4, for the buildings marked with N, a local flattening operation is performed in the three-dimensional model of oblique photography, so that stereo data of the region is leveled off.

In step 5, for the buildings marked with Y, real-time space editing is performed in the three-dimensional model of urban design to hide the marked buildings.

In step 6, two sets of data processed in step 4 and step 5 are simultaneously opened to implement mosaic display. Moreover, an effect of urban design scene emulation may be further enhanced through interaction between virtual reality device and external somatosensory devices.

In step 1, for oblique photography data in an established range obtained by collection, scene construction is performed through a series of technologies such as platform loading, geometric correction, and data thinning to form a three-dimensional model of oblique photography, and object management and feature extraction on a building model are implemented.

(1.1) Oblique photography data not less than an established range, that is, oblique data in an urban design range, is collected and acquired. Oblique photogrammetry refers to simultaneously collecting images at 1 vertical angle and 4 oblique angles by carrying a multi-lens camera unit on a flight platform. The flight platform is, for example, a multi-rotor unmanned aerial vehicle, a fixed-wing unmanned aerial vehicle, or a vertical take-off and landing unmanned aerial vehicle.

(1.2) The three-dimensional model of oblique photography based on real image texture is generated for the oblique photography data through automatic modeling software. The generated three-dimensional model of oblique photography is constructed by obtaining omni-directional information data of ground objects by performing a series of processing, such as geometric correction, joint adjustment, and multiview image matching, on the photography data through the automatic modeling software. The modeling software may be VirtualGeo software developed by DIGINEXT in France, or EFSElectronic Field Study software from Pictometry in the US.

(1.3) Load the three-dimensional model of oblique photography through a SuperMap platform The SuperMap platform uses Level of Detail (LOD) to optimize scheduling, which only takes up fewer hardware resources to ensure a stable capacity to bear massive data, and meanwhile, supports direct loading of oblique photography models of any subdivision type, including formats such as .osg/.osgb, .x, .dae, and .obj. The platform may generate, through a configuration file generation function, files in a *.scp format according to a plurality of pieces of oblique photography model data in a *.osgb format that are stored in a plurality of folders. The files record model configuration contents such as relative paths, names, insertion point positions, and coordinate system information of oblique photography model files. The platform implements direct batch loading and browsing of OSGB model data by loading three-dimensional model cache files in a *.scp format.

(1.4) A triangulated irregular network (TIN) is constructed, and high-resolution images taken from different angles are mapped onto a TIN model.

A Digital Surface Model (DSM) including various ground information such as terrain and buildings by using the three-dimensional model of oblique photography loaded to the scene. Then, all eligible contour lines in the digital surface model are extracted by inputting a specified height value. After acquisition of the contour lines, line data is converted into surface data through data transformation. A Douglas-Peucker node thinning algorithm is performed on the surface data to simplify a boundary line of the surface to form a grid surface model.

Point cloud data of the grid surface model is thinned and a continuous TIN is constructed by using a Delaunay triangulation algorithm. High-resolution images taken from different angles are mapped onto a TIN model through multi-view image matching. The high-resolution images are image data taken by oblique photography. Texture refers to features on the images, such as buildings.

(1.5) Building model object management: a two-dimensional basal surface of a building is extracted, and object management is implemented on a building model. A specific method is as follows.

In a TIN-format grid surface model, a two-dimensional basal surface of each building is outlined by using a multi-segment line command to successively connect vector points at a junction between the building and the ground, that is, endpoints in a triangulation network. For a building, the two-dimensional basal surface of the building and a vector surface of the triangulation network projected by the plane within the basal surface are combined together to form a single unit on which object management can be performed, so as to implement storage and management of geometric attribute information of each single building unit. The geometric attributes are bottom surface length, width, and building height information of a building object.

To implement the object management on a building model, the platform implements single-unit processing and attribute connection on all kinds of ground objects by generating a vector surface matching the model.

In step 2, coordinate system transformation is performed on a three-dimensional model of urban design in an established range, a three-dimensional model of urban design is located into a three-dimensional model of oblique photography, and geometric attributes for generation of each building are extracted.

(2.1) Edit the three-dimensional model of urban design

The three-dimensional model of urban design is one of the achievement forms of the urban design business. For a region corresponding to a design range, elements such as road, blocks, and buildings therein are modeled. The three-dimensional model of urban design referred to in this application refers in particular to buildings. A high-precision three-dimensional model of urban design achievements in an established range is edited by using SketchUp modeling software, the geographic position of the model is cleared, and latitude and longitude information is set to zero.

(2.2) Import the three-dimensional model of urban design to the SuperMap platform The SuperMap platform supports import of mainstream model data, including formats such as *.osg, *.osgb, *.dae, *.obj, *.ifc, *.3ds, *.dxf, *.fbx, *.x, and *.flt. The mainstream model data is directly imported to a model dataset and then is converted into system-supported UDB format data.

(2.3) Coordinate system transformation

A coordinate system consistent with the three-dimensional model of oblique photography, which is generally a 2000 Chinese Geodetic Coordinate System, is added to load a source of the three-dimensional model data of urban design into the scene. Through a model editing tool, a model and a reference point in the corresponding scene are selected, a coordinate offset of the reference point is inputted, and the model is entirely moved to the actual position in the scene.

(2.4) Add geometric attributes of buildings

An element attribute table is added through layer attribute editing, to implement storage and management of geometric information and attribute information of each building.

In step 3, for the scene of oblique photography and three-dimensional model data of urban design in a unified space coordinate system, automatic determination of space matching is performed by taking buildings as a basic unit, matched buildings are marked with Y, and mismatched buildings are marked with N.

(3.1) Index calculation

For three-dimensional models of the three-dimensional model of oblique photography and the three-dimensional model of urban design in the unified coordinate system, oblique models and three-dimensional model objects (such as buildings) with a spatial overlapping relationship are matched, a corresponding building basal surface in the three-dimensional model of oblique photography and a building basal surface in the three-dimensional model of urban design are generated, and three indexes, which are a basal surface shape similarity, an overlapping area ratio, and a building height feature similarity respectively, are calculated.

Basal surface shape similarity, SS for short: A value closer to 0 indicates higher shape similarity, and the SS describes the complexity of shape features by calculating a degree of deviation between the shape of a polygon and a square of the same area.

$$SS = \frac{2*|LSI_p - LSI_q|}{LSI_p + LSI_q}$$

$LSI_p$ and $LSI_q$ are calculated through the following formulas:

$$LSI_p = \frac{0.25*E1}{\sqrt{A1}}$$

$$LSI_q = \frac{0.25*E2}{\sqrt{A2}}$$

where $LSI_p$ denotes a building landscape shape index in the three-dimensional model of oblique photography, and $LSI_q$ denotes a building landscape shape index in the three-dimensional model of urban design; E1 denotes a polygon perimeter of the building basal surface in the three-dimensional model of oblique photography, and A1 denotes a polygon area of the building basal surface in the three-dimensional model of oblique photography; E2 denotes a polygon perimeter of the building basal surface in the three-dimensional model of urban design, and A2 denotes a polygon area of the building basal surface in the three-dimensional model of urban design. The landscape shape index is LSI for short.

Overlapping area ratio, OAR for short: In the following formula, the OAR is obtained by calculating a percentage of a polygon space superposed overlapping area on the basal surface, and A value closer to 0 indicates closer positions, $$OAR = 1 - \frac{2*A3}{A_p + A_q}$$

where $A_p$ denotes a polygon area of the building basal surface in the three-dimensional model of oblique photography, $A_q$ denotes a polygon area of the building basal surface in the three-dimensional model of urban design; and $A_p \cap A_q$ is used to denote an overlapping area between a polygon of the building basal surface in the three-dimensional model of oblique photography and a polygon of the building basal surface in the three-dimensional model of urban design, and the overlapping area is denoted as A3.

Height similarity, HS for short: A value closer to 0 indicates higher height similarity;

$$HS = \frac{2*|H_p - H_q|}{H_p + H_q}$$

where $H_p$ denotes a building height in the three-dimensional model of oblique photography, and $H_q$ denotes a building height in the three-dimensional model of urban design; and A space matching determination method is as follows: determining, through comparison, whether the three indexes, SS, OAR, and HS meet preset conditions:

SS<K1

OAR<K2

HS<K3 where K1, K2, and K3 are all preset constants, and are generally in a value range of (0, 0.1].

Automatic judgment is made by taking buildings as a basic unit, the building objects are marked with Y if the three all meet matching conditions, and the building objects are marked with N if one feature does not meet the matching conditions.

In step 4, for the buildings marked with N, a local flattening operation is performed in the three-dimensional model scene of oblique photography, so that stereo data of the region is leveled off.

(4.1) Modify the z value of a TIN grid on a two-dimensional basal surface of a building For a region of the buildings marked with N, a two-dimensional basal vector surface corresponding to the buildings is firstly generated, the basal surfaces are taken as a model flattening range, OSGB data of an oblique model in the region is queried through a flattened surface, a TIN corresponding to the oblique model in the region is extracted, the position (X, Y) of the plane is kept unchanged, a terrain height z' in the region is obtained through an interpolation algorithm, for example, a Kriging interpolation algorithm, and a height value Z of the TIN grid is modified to z'.

(4.2) Attach original texture images to a new TIN grid through affine transformation Affine transformation processing in geometric transformation is performed on a texture image corresponding to an original TIN network, space positions of original pixels are changed, and three-dimensional coordinates of each pixel in the image are linearly transformed, so that the pixels are all vertically projected to the TIN grid with the modified height value. Therefore, original texture images can be all attached to the new TIN grid.

Through the foregoing steps, a flattening operation on an oblique photography model of the region can be implemented, and a scheme model newly added to the design is displayed. The scheme model herein refers to buildings in an urban design model.

In step 5, for the buildings marked with Y, real-time space editing is performed in the three-dimensional model of urban design to hide the marked buildings.

(5.1) Establish an object group

All the building objects marked with Y are selected and edited into a group, so that the objects as a whole may be directly selected by clicking any object.

(5.2) The space of the group of the selected marked buildings is edited, and a hide option is clicked to hide the marked buildings.

In step 6, two sets of data processed in step 4 and step 5 are simultaneously opened to implement mosaic display, and an effect of urban design scene emulation can be further enhanced through interaction between virtual reality devices and external somatosensory devices.

(6.1) Mosaic display

The two sets of data processed in step 4 and step 5 are simultaneously opened to implement mosaic display.

(6.2) Optional connection to a virtual reality device

A scene is set, a stereo mode is started, a virtual reality (VR) device such as HTC Vive or Oculus Rift is connected, and free browsing is performed in a manner such as keyboard operation, automatic walking, or automatic running, to create a real three-dimensional immersive experience.

(6.3) Optional connection to an external somatosensory device

A scene is set, a stereo mode is started, and human body movement changes are dynamically captured in real time through connection to an external somatosensory device such as Microsoft Kinect or Leap Motion, and are automatically converted into three-dimensional operation instructions, so as to control traveling directions and attitudes of movement of observation points in the three-dimensional scene.

In addition, the present invention further provides an embedded urban design scene emulation system, the system including the following modules:

an oblique photography scene construction module, configured to process oblique photography data in an established range obtained by collection to construct a three-dimensional model of oblique photography, perform object management on buildings in the model, and extract geometric attributes for generation of each building;

an urban design model loading module, configured to load a three-dimensional model of urban design in an established range into a three-dimensional model scene of oblique photography, and extract geometric attributes for generation of each building;

a building space matching module, configured to perform, for the three-dimensional model scene of oblique photography and three-dimensional model data of urban design in a unified space coordinate system, automatic determination of space matching by taking buildings as a basic unit, matched buildings being marked with Y, and mismatched buildings being marked with N;

an oblique photography flattening module, configured to perform, for the buildings marked with N, a flattening operation in the scene of oblique photography, so that stereo data of the region is leveled off;

an urban design model hiding module, configured to perform, for the buildings marked with Y, real-time space editing in the three-dimensional model of urban design to hide the marked buildings; and a mosaic interaction display module, configured to simultaneously open two sets of data processed by the oblique photography flattening module and the urban design model hiding module to implement mosaic display.

Specific functions of the oblique photography scene construction module are as follows:

(1.1) collecting and acquiring oblique photography data not less than an established range, that is, oblique data in an urban design range;

(1.2) generating, for the oblique photography data, the three-dimensional model of oblique photography based on real image texture through automatic modeling software;

(1.3) loading the three-dimensional model of oblique photography through a SuperMap platform;

(1.4) constructing a TIN, and mapping high-resolution images taken from different angles onto a TIN model; and (1.5) extracting a two-dimensional basal surface of a building, further to implement object management on a building model.

Specific functions of the urban design model loading module are as follows:

(2.1) editing the three-dimensional model of urban design, clearing the geographic position of the model, and setting latitude and longitude information to zero;

(2.2) importing the three-dimensional model of urban design to the SuperMap platform;

(2.3) adding a coordinate system consistent with the three-dimensional model of oblique photography to load a source of the three-dimensional model data of urban design into the scene; and (2.4) adding an element attribute table through layer attribute editing, to implement storage and management of geometric information and attribute information of each building.

Specific functions of the building space matching module are as follows:

(3.1) matching building objects with a spatial overlapping relationship in three-dimensional models of the three-dimensional model of oblique photography and the three-dimensional model of urban design in the unified coordinate system, generating a corresponding building basal surface in the three-dimensional model of oblique photography and a building basal surface in the three-dimensional model of urban design, and calculating the following three indexes:

a basal surface shape similarity, SS for short:

$$SS = \frac{2 * |LSI_p - LSI_q|}{LSI_p + LSI_q}$$

$LSI_p$ and $LSI_q$ being calculated through the following formulas:

$$LSI_p = \frac{0.25 * E1}{\sqrt{A1}}$$

$$LSI_q = \frac{0.25 * E2}{\sqrt{A2}}$$

where $LSI_p$ denotes a building landscape shape index in the three-dimensional model of oblique photography, and $LSI_q$ denotes a building landscape shape index in the three-dimensional model of urban design; E1 denotes a polygon perimeter of the building basal surface in the three-dimensional model of oblique photography, and A1 denotes a polygon area of the building basal surface in the three-dimensional model of oblique photography; E2 denotes a polygon perimeter of the building basal surface in the three-dimensional model of urban design, and A2 denotes a polygon area of the building basal surface in the three-dimensional model of urban design; an overlapping area ratio, OAR for short:

$$OAR = 1 - \frac{2 * A3}{A_p + A_q}$$

where $A_p$ denotes a polygon area of the building basal surface in the three-dimensional model of oblique photography, $A_q$ denotes a polygon area of the building basal surface in the three-dimensional model of urban design; and A3 denotes an overlapping area between a polygon of the building basal surface in the three-dimensional model of oblique photography and a polygon of the building basal surface in the three-dimensional model of urban design; and a height similarity, HS for short:

$$HS = \frac{2 * |H_p - H_q|}{H_p + H_q}$$

where $H_p$ denotes a building height in the three-dimensional model of oblique photography, and $H_q$ denotes a building height in the three-dimensional model of urban design; and determining, through comparison, whether the three indexes, SS, OAR, and HS meet preset conditions:

SS<K1

OAR<K2

HS<K3 where K1, K2, and K3 are all preset constants, and are generally in a value range of (0, 0.1]; and (3.2) making automatic judgment by taking buildings as a basic unit, marking the building objects with Y if the three all meet matching conditions, and marking the building objects with N if one feature does not meet the matching conditions.

Specific functions of the oblique photography flattening module are as follows:

(4.1) for a region of the buildings marked with N, firstly generating a two-dimensional basal vector surface corresponding to the buildings, taking the basal surfaces as a model flattening range, querying OSGB data of an oblique model in the region through a flattened surface, extracting an irregular triangular grid corresponding to the oblique model in the region, keeping the position (X, Y) of the plane unchanged, obtaining a terrain height z' in the region through an interpolation algorithm, and modifying a height value Z of the triangular grid to z'; and (4.2) performing affine transformation processing on a texture image corresponding to an original triangular grid, changing space positions of original pixels, and linearly transforming three-dimensional coordinates of each pixel in the image, so that the pixels are all vertically projected to the triangular grid with the modified height value and original texture images are all attached to a new triangular grid.

Specific functions of the urban design model hiding module are as follows:

(5.1) selecting all the building objects marked with Y and editing the building objects into a group, so that the objects as a whole may be directly selected by clicking any object; and (5.2) editing the space of the group of the selected marked buildings, and clicking a hide option to hide the marked buildings.

Beneficial effects: compared with the prior art, the technical solutions of the present invention have the following beneficial technical effects.

In urban design scene emulation method and system for embedding a high-precision three-dimensional model into oblique photography provided in the present invention, both "status quo" and "design" are taken into account, a three-dimensional model of urban design is placed into stock space by using a computer technology, automatic determination of space matching and marking are performed on status quo buildings and environments represented by oblique photography and newly added and designed buildings and environments represented by the high-precision three-dimensional model, status quo buildings and environments retained after design are displayed still with oblique photography, and status quo buildings and environments not existing after design are "deleted" and replaced with newly-added buildings and environments under design, and then urban design scene emulation is implemented by editing, to avoid the problems that the conventional operation cannot take both the status quo and design into account, or the arbitrariness of technical results and the low work efficiency in the manual embedding manner. The urban design scene emulation finally achieved provides a reliable method and system support for intuitive presentation and easy understanding of complex urban space and design achievements.

DETAILED DESCRIPTION

Figure 1:
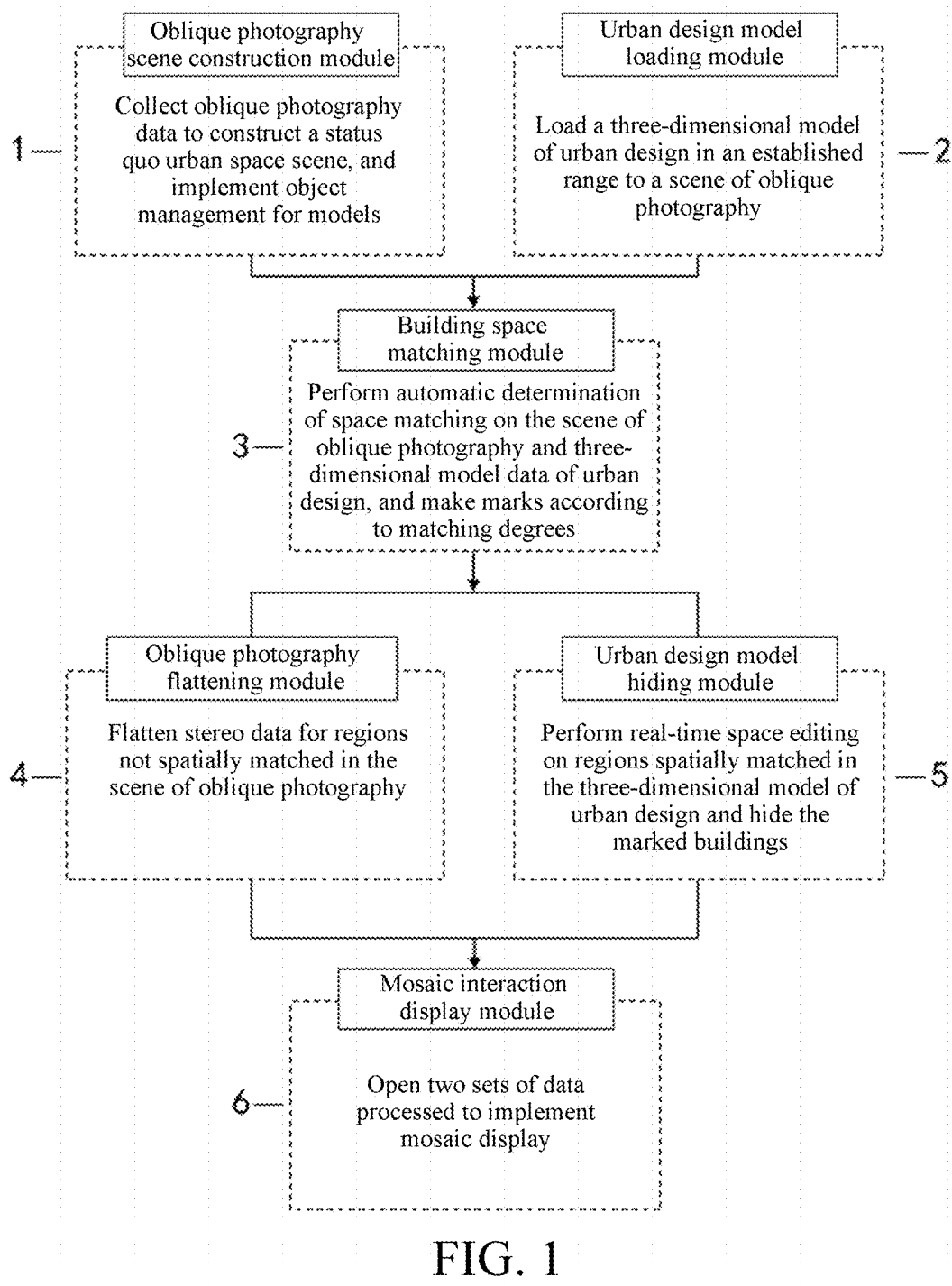
FIG. 1 is a technical flowchart of an embedded urban design scene emulation method according to the present invention.
Figure 2:
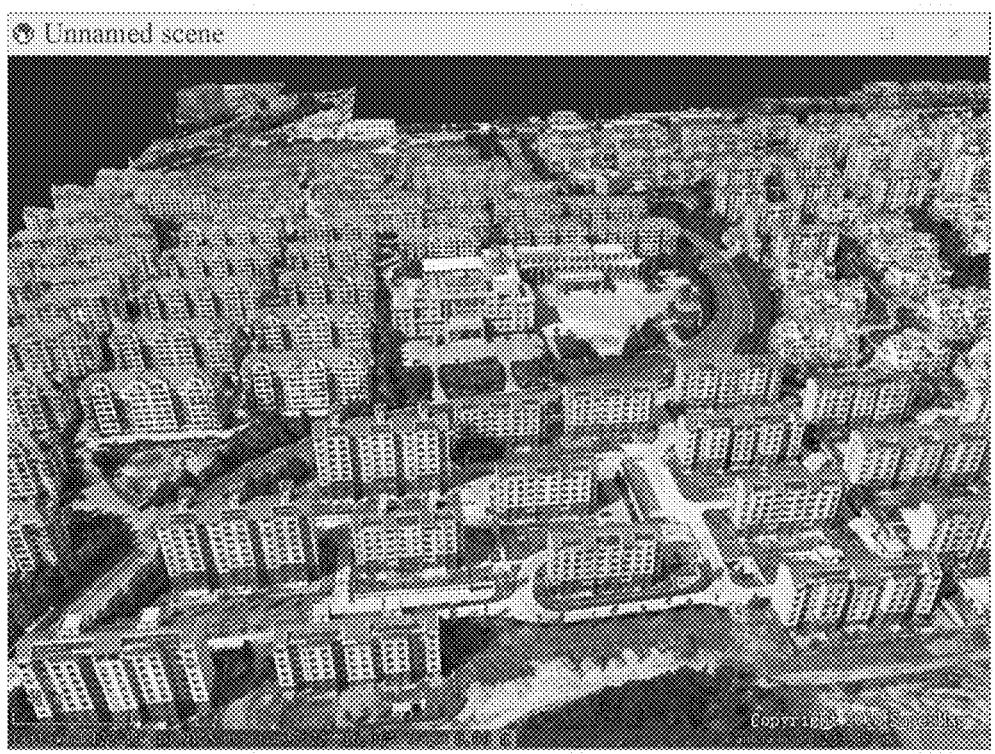
FIG. 2 is a diagram illustrating loading of a three-dimensional model of oblique photography to a SuperMap platform according to the present invention.
Figure 3:
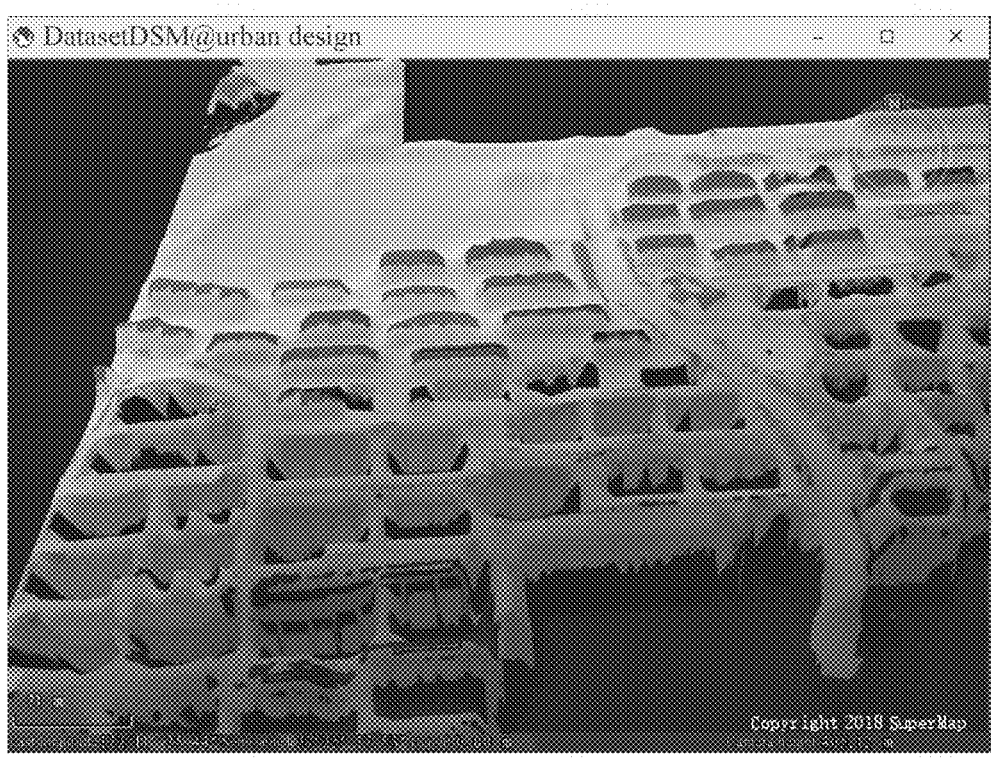
FIG. 3 is a diagram illustrating conversion of oblique photography data into a grid surface model according to the present invention.
Figure 4:
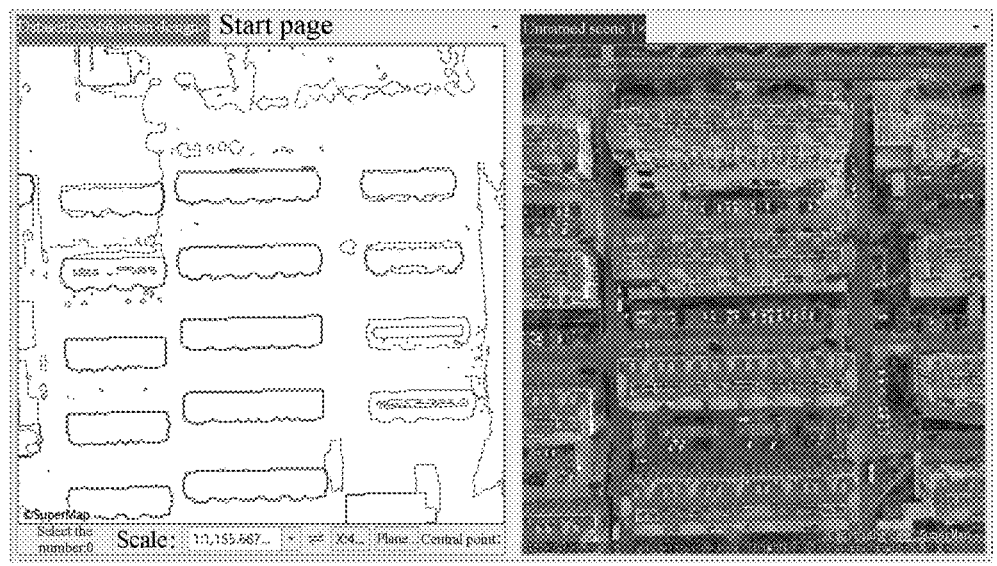
FIG. 4 is a profile of an extracted two-dimensional basal surface of a building according to the present invention.
Figure 5:
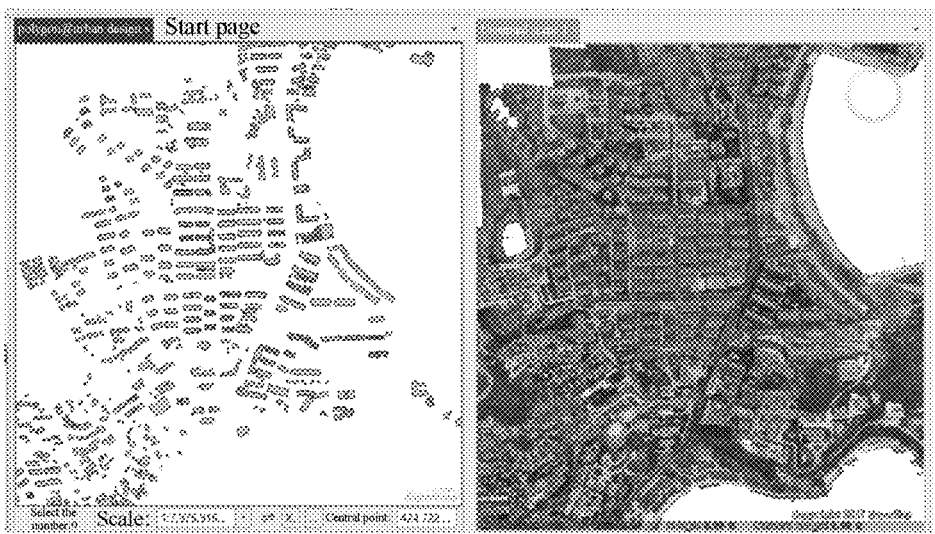
FIG. 5 is a diagram illustrating building model object management in an oblique photography scene according to the present invention.
Figure 6:
FIG. 6 is a diagram illustrating a three-dimensional model of urban design according to the present invention.
Figure 7:
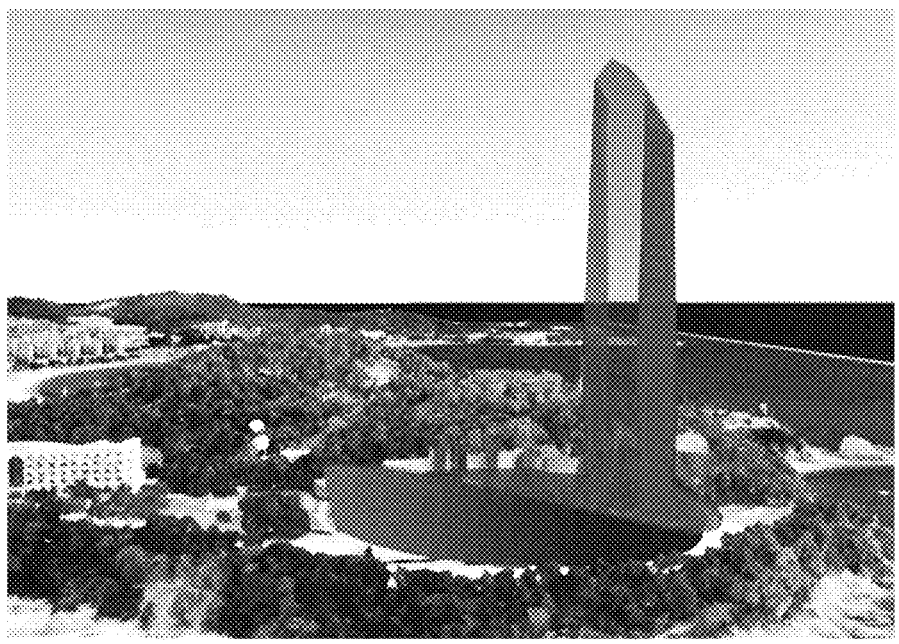
FIG. 7 is a diagram illustrating space matching on buildings according to the present invention.
Figure 8:
FIG. 8 is a comparison diagram of a three-dimensional model of oblique photography before and after pressing according to the present invention.
Figure 8:
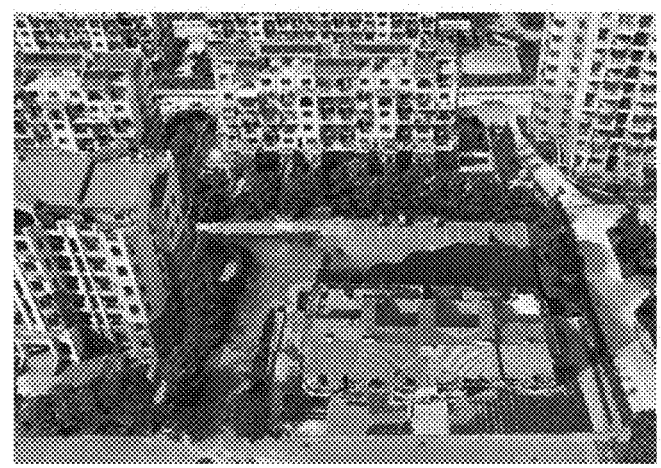
Figure 9:
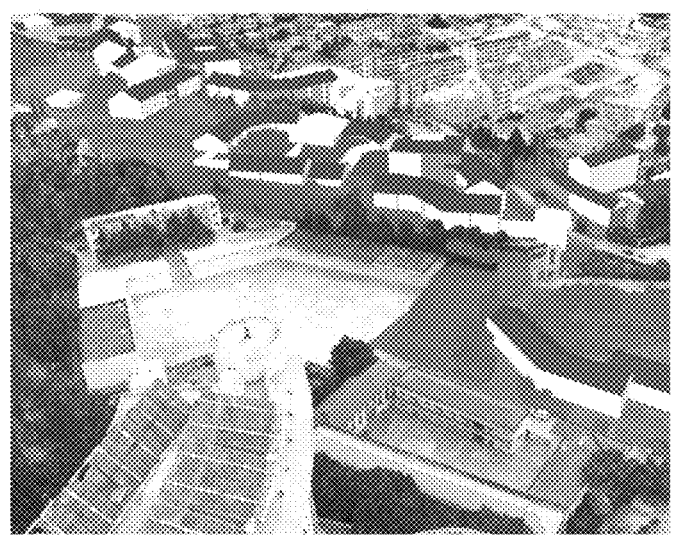
FIG. 9 is a diagram illustrating mosaic display of a three-dimensional model of oblique photography and a three-dimensional model of urban design according to the present invention.

The technical solutions of the present invention are further described below with reference to the accompanying drawings and embodiments.

The present invention provides an embedded urban design scene emulation method, the method including the following steps.

In step 1, for oblique photography data in an established range obtained by collection, scene construction is performed through a series of technologies such as platform loading, geometric correction, and data thinning to form a three-dimensional model of oblique photography, and object management and feature extraction on a building model are implemented. The feature extraction means extracting geometric attributes for generation of each building.

In step 2, coordinate system transformation is performed on a three-dimensional model of urban design in an established range, three-dimensional model data of urban design is loaded into a three-dimensional model scene of oblique photography, and geometric attributes for generation of each building are extracted. The three-dimensional model of urban design is one of the achievement forms of the urban design business. For a region corresponding to a design range, elements such as road, blocks, and buildings therein are modeled. The three-dimensional model of urban design referred to in this application refers in particular to buildings.

In step 3, for the three-dimensional model scene of oblique photography and three-dimensional model data of urban design in a unified space coordinate system, automatic determination of space matching is performed by taking buildings as a basic unit, matched buildings are marked with Y, and mismatched buildings are marked with N.

In step 4, for the buildings marked with N, a flattening operation is performed in the three-dimensional model of oblique photography, so that stereo data of the region is leveled off.

In step 5, for the buildings marked with Y, real-time space editing is performed in the three-dimensional model of urban design to hide the marked buildings.

In step 6, two sets of data processed in step 4 and step 5 are simultaneously opened to implement mosaic display. Moreover, an effect of urban design scene emulation may be further enhanced through interaction between virtual reality devices and external somatosensory devices.

In step 1, for oblique photography data in an established range obtained by collection, scene construction is performed through a series of technologies such as platform loading, geometric correction, and data thinning to form a three-dimensional model of oblique photography, and object management and feature extraction on a building model are implemented.

(1.1) Oblique photography data not less than an established range, that is, oblique data in an urban design range, is collected and acquired. Oblique photogrammetry refers to simultaneously collecting images at 1 vertical angle and 4 oblique angles by carrying a multi-lens camera unit on a flight platform. The flight platform is, for example, a multi-rotor unmanned aerial vehicle, a fixed-wing unmanned aerial vehicle, or a vertical take-off and landing unmanned aerial vehicle.

(1.2) The three-dimensional model of oblique photography based on real image texture is generated for the oblique photography data through automatic modeling software. The generated three-dimensional model of oblique photography is constructed by obtaining omni-directional information data of ground objects by performing a series of processing, such as geometric correction, joint adjustment, and multi-view image matching, on the photography data through the automatic modeling software. The modeling software may be VirtualGeo software developed by DIGINEXT in France, or EFSElectronic Field Study software from Pictometry in the US.

(1.3) Load the three-dimensional model of oblique photography through a SuperMap platform The SuperMap platform uses LOD to optimize scheduling, which only takes up fewer hardware resources to ensure a stable capacity to bear massive data, and meanwhile, supports direct loading of oblique photography models of any subdivision type, including formats such as .osg/.osgb, .x, .dae, and .obj. The platform may generate, through a configuration file generation function, files in a *.scp format according to a plurality of pieces of oblique photography model data in a *.osgb format that are stored in a plurality of folders. The files record model configuration contents such as relative paths, names, insertion point positions, and coordinate system information of oblique photography model files. The platform implements direct batch loading and browsing of OSGB model data by loading three-dimensional model cache files in a *.scp format.

(1.4) A TIN is constructed, and high-resolution images taken from different angles are mapped onto a TIN model.

A DSM including various ground information such as terrain and buildings by using the three-dimensional model of oblique photography loaded to the scene. Then, all eligible contour lines in the digital surface model are extracted by inputting a specified height value. After acquisition of the contour lines, line data is converted into surface data through data transformation. A Douglas-Peucker node thinning algorithm is performed on the surface data to simplify a boundary line of the surface to form a grid surface model.

Point cloud data of the grid surface model is thinned and a continuous TIN is constructed by using a Delaunay triangulation algorithm. High-resolution images taken from different angles are mapped onto a TIN model through multi-view image matching. The high-resolution images are image data taken by oblique photography. Texture refers to features on the images, such as buildings.

(1.5) Building model object management:

A two-dimensional basal surface of a building is extracted, and object management is implemented on a building model. A specific method is as follows.

In a TIN-format grid surface model, a two-dimensional basal surface of each building is outlined by using a multi-segment line command to successively connect vector points at a junction between the building and the ground, that is, endpoints in a triangulation network. For a building, the two-dimensional basal surface of the building and a vector surface of the triangulation network projected by the plane within the basal surface are combined together to form a single unit on which object management can be performed, so as to implement storage and management of geometric attribute information of each single building unit.

To implement the object management on a building model, the platform implements single-unit processing and attribute connection on all kinds of ground objects by generating a vector surface matching the model.

In step 2, coordinate system transformation is performed on a three-dimensional model of urban design in an established range, a three-dimensional model of urban design is located into a three-dimensional model of oblique photography, and geometric attributes for generation of each building are extracted.

(2.1) Edit the three-dimensional model of urban design

The three-dimensional model of urban design is one of the achievement forms of the urban design business. For a region corresponding to a design range, elements such as road, blocks, and buildings therein are modeled. The three-dimensional model of urban design referred to in this application refers in particular to buildings. A high-precision three-dimensional model of urban design achievements in an established range is edited by using SketchUp modeling software, the geographic position of the model is cleared, and latitude and longitude information is set to zero.

(2.2) Import the three-dimensional model of urban design to the SuperMap platform The SuperMap platform supports import of mainstream model data, including formats such as *.osg, *.osgb, *.dae, *.obj, *.ifc, *.3ds, *.dxf, *.fbx, *.x, and *.flt. The mainstream model data is directly imported to a model dataset and then is converted into system-supported UDB format data.

(2.3) Coordinate system transformation

A coordinate system consistent with the three-dimensional model of oblique photography, which is generally a 2000 Chinese Geodetic Coordinate System, is added to load a source of the three-dimensional model data of urban design into the scene. Through a model editing tool, a model and a reference point in the corresponding scene are selected, a coordinate offset of the reference point is inputted, and the model is entirely moved to the actual position in the scene.

(2.4) Add geometric attributes of buildings

An element attribute table is added through layer attribute editing, to implement storage and management of geometric information and attribute information of each building.

In step 3, for the scene of oblique photography and three-dimensional model data of urban design in a unified space coordinate system, automatic determination of space matching is performed by taking buildings as a basic unit, matched buildings are marked with Y, and mismatched buildings are marked with N.

(3.1) Index calculation

For three-dimensional models of the three-dimensional model of oblique photography and the three-dimensional model of urban design in the unified coordinate system, oblique models and three-dimensional model objects (such as buildings) with a spatial overlapping relationship are matched, a corresponding building basal surface in the three-dimensional model of oblique photography and a building basal surface in the three-dimensional model of urban design are generated, and three indexes, which are a basal surface shape similarity, an overlapping area ratio, and a building height feature similarity respectively, are calculated.

Basal surface shape similarity, SS for short: A value closer to 0 indicates higher shape similarity, and the SS describes the complexity of shape features by calculating a degree of deviation between the shape of a polygon and a square of the same area.

$$SS = \frac{2*|LSI_p - LSI_q|}{LSI_p + LSI_q}$$

$LSI_p$ and $LSI_q$ are calculated through the following formulas:

$$LSI_p = \frac{0.25*E1}{\sqrt{A1}}$$

$$LSI_q = \frac{0.25*E2}{\sqrt{A2}}$$

where $LSI_p$ denotes a building landscape shape index in the three-dimensional model of oblique photography, and $LSI_q$ denotes a building landscape shape index in the three-dimensional model of urban design; E1 denotes a polygon perimeter of the building basal surface in the three-dimensional model of oblique photography, and A1 denotes a polygon area of the building basal surface in the three-dimensional model of oblique photography; E2 denotes a polygon perimeter of the building basal surface in the three-dimensional model of urban design, and A2 denotes a polygon area of the building basal surface in the three-dimensional model of urban design. The landscape shape index is LSI for short.

Overlapping area ratio, OAR for short: In the following formula, the OAR is obtained by calculating a percentage of a polygon space superposed overlapping area on the basal surface, and A value closer to 0 indicates closer positions, $$OAR = 1 - \frac{2*A3}{A_p + A_q}$$

where $A_p$ denotes a polygon area of the building basal surface in the three-dimensional model of oblique photography, $A_q$ denotes a polygon area of the building basal surface in the three-dimensional model of urban design; and $A_p \cap A_q$ is used to denote an overlapping area between a polygon of the building basal surface in the three-dimensional model of oblique photography and a polygon of the building basal surface in the three-dimensional model of urban design, and the overlapping area is denoted as A3.

Height similarity, HS for short: A value closer to 0 indicates higher height similarity;

$$HS = \frac{2*|H_p - H_q|}{H_p + H_q}$$

where $H_p$ denotes a building height in the three-dimensional model of oblique photography, and $H_q$ denotes a building height in the three-dimensional model of urban design; and A space matching determination method is as follows: determining, through comparison, whether the three indexes, SS, OAR, and HS meet preset conditions:

SS<K1

OAR<K2

HS<K3 where K1, K2, and K3 are all preset constants, and are generally in a value range of (0, 0.1].

Automatic judgment is made by taking buildings as a basic unit, the building objects are marked with Y if the three all meet matching conditions, and the building objects are marked with N if one feature does not meet the matching conditions.

In step 4, for the buildings marked with N, a local flattening operation is performed on the three-dimensional model scene of oblique photography, so that stereo data of the region is leveled off.

(4.1) Modify the z value of a TIN grid on a two-dimensional basal surface of a building For a region of the buildings marked with N, a two-dimensional basal vector surface corresponding to the buildings is firstly generated, the basal surfaces are taken as a model flattening range, OSGB data of an oblique model in the region is queried through a flattened surface, a TIN corresponding to the oblique model in the region is extracted, the position (X, Y) of the plane is kept unchanged, a terrain height z' in the region is obtained through an interpolation algorithm, for example, a Kriging interpolation algorithm, and a height value Z of the TIN grid is modified to z'.

(4.2) Attach original texture images to a new TIN grid through affine transformation Affine transformation processing in geometric transformation is performed on a texture image corresponding to an original TIN network, space positions of original pixels are changed, and three-dimensional coordinates of each pixel in the image are linearly transformed, so that the pixels are all vertically projected to the TIN grid with the modified height value. Therefore, original texture images can be all attached to the new TIN grid.

Through the foregoing steps, a flattening operation on an oblique photography model of the region can be implemented, and a scheme model newly added to the design is displayed. The scheme model herein refers to buildings in an urban design model.

In step 5, for the buildings marked with Y, real-time space editing is performed in the three-dimensional model of urban design to hide the marked buildings.

(5.1) Establish an object group

All the building objects marked with Y are selected and edited into a group, so that the objects as a whole may be directly selected by clicking any object.

(5.2) The space of the group of the selected marked buildings is edited, and a hide option is clicked to hide the marked buildings.

In step 6, two sets of data processed in step 4 and step 5 are simultaneously opened to implement mosaic display, and an effect of urban design scene emulation can be further enhanced through interaction between virtual reality devices and external somatosensory devices.

(6.1) Mosaic display

The two sets of data processed in step 4 and step 5 are simultaneously opened to implement mosaic display.

(6.2) Optional connection to a virtual reality device

A scene is set, a stereo mode is started, a virtual reality (VR) device such as HTC Vive or Oculus Rift is connected, and free browsing is performed in a manner such as keyboard operation, automatic walking, or automatic running, to create a real three-dimensional immersive experience.

(6.3) Optional connection to an external somatosensory device

A scene is set, a stereo mode is started, and human body movement changes are dynamically captured in real time through connection to an external somatosensory device such as Microsoft Kinect or Leap Motion, and are automatically converted into three-dimensional operation instructions, so as to control traveling directions and attitudes of movement of observation points in the three-dimensional scene.

In addition, the present invention further provides an embedded urban design scene emulation system, the system including the following modules:

an oblique photography scene construction module, configured to process oblique photography data in an established range obtained by collection to construct a three-dimensional model of oblique photography, perform object management on buildings in the model, and extract geometric attributes for generation of each building;

an urban design model loading module, configured to load a three-dimensional model of urban design in an established range into a three-dimensional model scene of oblique photography, and extract geometric attributes for generation of each building;

a building space matching module, configured to perform, for the three-dimensional model scene of oblique photography and three-dimensional model data of urban design in a unified space coordinate system, automatic determination of space matching by taking buildings as a basic unit, matched buildings being marked with Y, and mismatched buildings being marked with N;

an oblique photography flattening module, configured to perform, for the buildings marked with N, a local flattening operation in the scene of oblique photography, so that stereo data of the region is leveled off;

an urban design model hiding module, configured to perform, for the buildings marked with Y, real-time space editing in the three-dimensional model of urban design to hide the marked buildings; and a mosaic interaction display module, configured to simultaneously open two sets of data processed by the oblique photography flattening module and the urban design model hiding module to implement mosaic display.

Specific functions of the oblique photography scene construction module are as follows:

(1.1) collecting and acquiring oblique photography data not less than an established range, that is, oblique data in an urban design range;

(1.2) generating, for the oblique photography data, the three-dimensional model of oblique photography based on real image texture through automatic modeling software;

(1.3) loading the three-dimensional model of oblique photography through a SuperMap platform;

(1.4) constructing a TIN, and mapping high-resolution images taken from different angles onto a TIN model; and (1.5) extracting a two-dimensional basal surface of a building, further to implement object management on a building model.

Specific functions of the urban design model loading module are as follows:

(2.1) editing the three-dimensional model of urban design, clearing the geographic position of the model, and setting latitude and longitude information to zero;

(2.2) importing the three-dimensional model of urban design to the SuperMap platform;

(2.3) adding a coordinate system consistent with the three-dimensional model of oblique photography to load a source of the three-dimensional model data of urban design into the scene; and (2.4) adding an element attribute table through layer attribute editing, to implement storage and management of geometric information and attribute information of each building.

Specific functions of the building space matching module are as follows:

(3.1) matching building objects with a spatial overlapping relationship in three-dimensional models of the three-dimensional model of oblique photography and the three-dimensional model of urban design in the unified coordinate system, generating a corresponding building basal surface in the three-dimensional model of oblique photography and a building basal surface in the three-dimensional model of urban design, and calculating the following three indexes:

a basal surface shape similarity, SS for short:

$$SS = \frac{2*|LSI_p - LSI_q|}{LSI_p + LSI_q}$$

$LSI_p$ and $LSI_q$ being calculated through the following formulas:

$$LSI_p = \frac{0.25*E1}{\sqrt{A1}}$$

$$LSI_q = \frac{0.25*E2}{\sqrt{A2}}$$

where $LSI_p$ denotes a building landscape shape index in the three-dimensional model of oblique photography, and $LSI_q$ denotes a building landscape shape index in the three-dimensional model of urban design; E1 denotes a polygon perimeter of the building basal surface in the three-dimensional model of oblique photography, and A1 denotes a polygon area of the building basal surface in the three-dimensional model of oblique photography; E2 denotes a polygon perimeter of the building basal surface in the three-dimensional model of urban design, and A2 denotes a polygon area of the building basal surface in the three-dimensional model of urban design; an overlapping area ratio, OAR for short:

$$OAR = 1 - \frac{2*A3}{A_p + A_q}$$

where $A_p$ denotes a polygon area of the building basal surface in the three-dimensional model of oblique photography, $A_q$ denotes a polygon area of the building basal surface in the three-dimensional model of urban design; and A3 denotes an overlapping area between a polygon of the building basal surface in the three-dimensional model of oblique photography and a polygon of the building basal surface in the three-dimensional model of urban design; and a height similarity, HS for short:

$$HS = \frac{2*|H_p - H_q|}{H_p + H_q}$$

where $H_p$ denotes a building height in the three-dimensional model of oblique photography, and $H_q$ denotes a building height in the three-dimensional model of urban design; and determining, through comparison, whether the three indexes, SS, OAR, and HS meet preset conditions:

SS<K1

OAR<K2

HS<K3 where K1, K2, and K3 are all preset constants, and are generally in a value range of (0, 0.1]; and (3.2) making automatic judgment by taking buildings as a basic unit, marking the building objects with Y if the three all meet matching conditions, and marking the building objects with N if one feature does not meet the matching conditions.

Specific functions of the oblique photography flattening module are as follows:

(4.1) for a region of the buildings marked with N, firstly generating a two-dimensional basal vector surface corresponding to the buildings, taking the basal surfaces as a model flattening range, querying OSGB data of an oblique model in the region through a flattened surface, extracting an irregular triangular grid corresponding to the oblique model in the region, keeping the position (X, Y) of the plane unchanged, obtaining a terrain height z' in the region through an interpolation algorithm, and modifying a height value Z of the triangular grid to z'; and (4.2) performing affine transformation processing on a texture image corresponding to an original triangular grid, changing space positions of original pixels, and linearly transforming three-dimensional coordinates of each pixel in the image, so that the pixels are all vertically projected to the triangular grid with the modified height value and original texture images are all attached to a new triangular grid.

Specific functions of the urban design model hiding module are as follows:

(5.1) selecting all the building objects marked with Y and editing the building objects into a group, so that the objects as a whole may be directly selected by clicking any object; and (5.2) editing the space of the group of the selected marked buildings, and clicking a hide option to hide the marked buildings.

What is claimed is:

1. An embedded urban design scene emulation method, wherein the method comprises the following steps:
    step 1: processing oblique photography data in an established range obtained by collection to construct a three-dimensional model of oblique photography, performing object management on buildings in the model, and extracting geometric attributes for generation of each building;
    step 2: loading a three-dimensional model of urban design in an established range into a three-dimensional model scene of oblique photography, and extracting geometric attributes for generation of each building;
    step 3: performing, for the three-dimensional model scene of oblique photography and three-dimensional model data of urban design in a unified space coordinate system, automatic determination of space matching by taking buildings as a basic unit, matched buildings being marked with Y, and mismatched buildings being marked with N;
    step 4: performing, for the buildings marked with N, a flattening operation in the three-dimensional model of oblique photography, so that stereo data of the region is leveled off;
    step 5: performing, for the buildings marked with Y, real-time space editing in the three-dimensional model of urban design to hide the marked buildings; and
    step 6: simultaneously opening two sets of data processed in step 4 and step 5 to implement mosaic display.

2. The embedded urban design scene emulation method according to claim 1, wherein a specific method for step (1) is as follows:
    (1.1) collecting and acquiring oblique photography data not less than an established range, that is, oblique data in an urban design range;
    (1.2) generating, for the oblique photography data, the three-dimensional model of oblique photography based on real image texture through automatic modeling software;
    (1.3) loading the three-dimensional model of oblique photography through a SuperMap platform;
    (1.4) constructing a triangulated irregular network (TIN), and mapping high-resolution images taken from different angles onto a TIN model; and
    (1.5) extracting a two-dimensional basal surface of a building, to implement object management on a building model.

3. The embedded urban design scene emulation method according to claim 1, wherein a specific method for step (2) is as follows:
    (2.1) editing the three-dimensional model of urban design, clearing the geographic position of the model, and setting latitude and longitude information to zero;
    (2.2) importing the three-dimensional model of urban design to the SuperMap platform;
    (2.3) adding a coordinate system consistent with the three-dimensional model of oblique photography to load a source of the three-dimensional model data of urban design into the scene; and
    (2.4) adding an element attribute table through layer attribute editing, to implement storage and management of geometric information and attribute information of each building.

4. The embedded urban design scene emulation method according to claim 3, wherein a specific method for step (3) is as follows:
    (3.1) matching building objects with a spatial overlapping relationship in three-dimensional models of the three-dimensional model of oblique photography and the three-dimensional model of urban design in the unified coordinate system, generating a corresponding building basal surface in the three-dimensional model of oblique photography and a building basal surface in the three-dimensional model of urban design, and calculating the following three indexes:
    a basal surface shape similarity, SS for short:

$$SS = \frac{2*|LSI_p - LSI_q|}{LSI_p + LSI_q}$$

$LSI_p$ and $LSI_q$ being calculated through the following formulas:

$$LSI_p = \frac{0.25*E1}{\sqrt{A1}}$$

$$LSI_q = \frac{0.25*E2}{\sqrt{A2}}$$

wherein $LSI_p$ denotes a building landscape shape index in the three-dimensional model of oblique photography, and $LSI_q$ denotes a building landscape shape index in the three-dimensional model of urban design; E1 denotes a polygon perimeter of the building basal surface in the three-dimensional model of oblique photography, and A1 denotes a polygon area of the building basal surface in the three-dimensional model of oblique photography; E2 denotes a polygon perimeter of the building basal surface in the three-dimensional model of urban design, and A2 denotes a polygon area of the building basal surface in the three-dimensional model of urban design; an overlapping area ratio, OAR for short:

$$OAR = 1 - \frac{2*A3}{A_p + A_q}$$

wherein $A_p$ denotes a polygon area of the building basal surface in the three-dimensional model of oblique photography, $A_q$ denotes a polygon area of the building basal surface in the three-dimensional model of urban design; and A3 denotes an overlapping area between a polygon of the building basal surface in the three-dimensional model of oblique photography and a polygon of the building basal surface in the three-dimensional model of urban design; and a height similarity, HS for short:

$$HS = \frac{2*|H_p - H_q|}{H_p + H_q}$$

wherein $H_p$ denotes a building height in the three-dimensional model of oblique photography, and $H_q$ denotes a building height in the three-dimensional model of urban design; and determining, through comparison, whether the three indexes, SS, OAR, and HS meet preset conditions:

SS<K1

OAR<K2

HS<K3 wherein K1, K2, and K3 are all preset constants, and are generally in a value range of (0, 0.1]; and (3.2) making automatic judgment by taking buildings as a basic unit, marking the building objects with Y if the three all meet matching conditions, and marking the building objects with N if one feature does not meet the matching conditions.

5. The embedded urban design scene emulation method according to claim 3, wherein a method for step (4) is as follows:
(4.1) for a region of the buildings marked with N, firstly generating a two-dimensional basal vector surface corresponding to the buildings, taking the basal surfaces as a model flattening range, querying OpenSceneGraph Binary (OSGB) data of an oblique model in the region through a flattened surface, extracting an irregular triangular grid corresponding to the oblique model in the region, keeping the position (X, Y) of the plane unchanged, obtaining a terrain height z' in the region through an interpolation algorithm, and modifying a height value Z of the triangular grid to z'; and
(4.2) performing affine transformation processing on a texture image corresponding to an original triangular grid, changing space positions of original pixels, and linearly transforming three-dimensional coordinates of each pixel in the image, so that the pixels are all vertically projected to the triangular grid with the modified height value and original texture images are all attached to a new triangular grid.

6. The embedded urban design scene emulation method according to claim 3, wherein a method for step (5) is as follows:
(5.1) selecting all the building objects marked with Y and editing the building objects into a group, so that the objects as a whole are directly selected by clicking any object; and
(5.2) editing the space of the group of the selected marked buildings, and clicking a hide option to hide the marked buildings.

7. The embedded urban design scene emulation method according to claim 6, wherein the two sets of data processed in step 4 and step 5 are connected to a virtual reality device or an external somatosensory device.

8. An embedded urban design scene emulation system, wherein the system comprises a processor that is configured to function as:
an oblique photography scene construction module, configured to process oblique photography data in an established range obtained by collection to construct a three-dimensional model of oblique photography, perform object management on buildings in the model, and extract geometric attributes for generation of each building;
an urban design model loading module, configured to load a three-dimensional model of urban design in an established range into a three-dimensional model scene of oblique photography, and extract geometric attributes for generation of each building;
a building space matching module, configured to perform, for the three-dimensional model scene of oblique photography and three-dimensional model data of urban design in a unified space coordinate system, automatic determination of space matching by taking buildings as a basic unit, matched buildings being marked with Y, and mismatched
buildings being marked with N;
an oblique photography flattening module, configured to perform, for the buildings marked with N, a flattening operation in the three-dimensional model of oblique photography, so that stereo data of the region is leveled off;
an urban design model hiding module, configured to perform, for the buildings marked with Y, real-time space editing in the three-dimensional model of urban design to hide the marked buildings; and
a mosaic interaction display module, configured to simultaneously open two sets of data processed by the oblique photography flattening module and the urban design model hiding module to implement mosaic display.

9. The embedded urban design scene emulation system according to claim 8, wherein specific functions of the oblique photography scene construction module are as follows:
(1.1) collecting and acquiring oblique photography data not less than an established range, that is, oblique data in an urban design range;
(1.2) generating, for the oblique photography data, the three-dimensional model of oblique photography based on real image texture through automatic modeling software;
(1.3) loading the three-dimensional model of oblique photography through a SuperMap platform;
(1.4) constructing a triangulated irregular network (TIN), and mapping high-resolution images taken from different angles onto a TIN model; and (1.5) extracting a two-dimensional basal surface of a building, and implementing object management on a building model.

10. The embedded urban design scene emulation system according to claim 8, wherein specific functions of the urban design model loading module are as follows:
   (2.1) editing the three-dimensional model of urban design, clearing the geographic position of the model, and setting latitude and longitude information to zero;
   (2.2) importing the three-dimensional model of urban design to the SuperMap platform;
   (2.3) adding a coordinate system consistent with the three-dimensional model of oblique photography to load a source of the three-dimensional model data of urban design into the scene; and
   (2.4) adding an element attribute table through layer attribute editing, to implement storage and management of geometric information and attribute information of each building.

11. The embedded urban design scene emulation system according to claim 8, wherein specific functions of the building space matching module are as follows:
   (3.1) matching building objects with a spatial overlapping relationship in three-dimensional models of the three-dimensional model of oblique photography and the three-dimensional model of urban design in the unified coordinate system, generating a corresponding building basal surface in the three-dimensional model of oblique photography and a building basal surface in the three-dimensional model of urban design, and calculating the following three indexes:
   a basal surface shape similarity, SS for short:

$$SS = \frac{2*|LSI_p - LSI_q|}{LSI_p + LSI_q}$$

$LSI_p$ and $LSI_q$ being calculated through the following formulas:

$$LSI_p = \frac{0.25*E1}{\sqrt{A1}}$$

$$LSI_q = \frac{0.25*E2}{\sqrt{A2}}$$

wherein $LSI_p$ denotes a building landscape shape index in the three-dimensional model of oblique photography, and $LSI_q$ denotes a building landscape shape index in the three-dimensional model of urban design; E1 denotes a polygon perimeter of the building basal surface in the three-dimensional model of oblique photography, and A1 denotes a polygon area of the building basal surface in the three-dimensional model of oblique photography; E2 denotes a polygon perimeter of the building basal surface in the three-dimensional model of urban design, and A2 denotes a polygon area of the building basal surface in the three-dimensional model of urban design; an overlapping area ratio, OAR for short:

$$OAR = 1 - \frac{2*A3}{A_p + A_q}$$

wherein $A_p$ denotes a polygon area of the building basal surface in the three-dimensional model of oblique photography, $A_q$ denotes a polygon area of the building basal surface in the three-dimensional model of urban design; and A3 denotes an overlapping area between a polygon of the building basal surface in the three-dimensional model of oblique photography and a polygon of the building basal surface in the three-dimensional model of urban design; and
   a height similarity, HS for short:

$$HS = \frac{2*|H_p - H_q|}{H_p + H_q}$$

wherein $H_p$ denotes a building height in the three-dimensional model of oblique photography, and $H_q$ denotes a building height in the three-dimensional model of urban design; and
   determining, through comparison, whether the three indexes, SS, OAR, and HS meet preset conditions:

SS<K1

OAR<K2

HS<K3 wherein K1, K2, and K3 are all preset constants, and are generally in a value range of (0, 0.1); and
   (3.2) making automatic judgment by taking buildings as a basic unit, marking the building objects with Y if the three all meet matching conditions, and marking the building objects with N if one feature does not meet the matching conditions.

12. The embedded urban design scene emulation system according to claim 11, wherein specific functions of the oblique photography flattening module are as follows:
   (4.1) for a region of the buildings marked with N, firstly generating a two-dimensional basal vector surface corresponding to the buildings, taking the basal surfaces as a model flattening range, querying OpenSceneGraph Binary (OSGB) data of an oblique model in the region through a flattened surface, extracting an irregular triangular grid corresponding to the oblique model in the region, keeping the position (X, Y) of the plane unchanged, obtaining a terrain height z' in the region through an interpolation algorithm, and modifying a height value Z of the triangular grid to z'; and
   (4.2) performing affine transformation processing on a texture image corresponding to an original triangular grid, changing space positions of original pixels, and linearly transforming three-dimensional coordinates of each pixel in the image, so that the pixels are all vertically projected to the triangular grid with the modified height value and original texture images are all attached to a new triangular grid.

13. The embedded urban design scene emulation system according to claim 11, wherein specific functions of the urban design model hiding module are as follows:
   (5.1) selecting all the building objects marked with Y and editing the building objects into a group, so that the objects as a whole are directly selected by clicking any object; and
   (5.2) editing the space of the group of the selected marked buildings, and clicking a hide option to hide the marked buildings.

* * * * *